(12) United States Patent
Konijn

(10) Patent No.: US 6,460,834 B2
(45) Date of Patent: Oct. 8, 2002

(54) GAS/LIQUID CONTACT TRAY

(75) Inventor: Gerrit Konijn, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/757,882

(22) Filed: Jan. 10, 2001

(65) Prior Publication Data

US 2001/0015502 A1 Aug. 23, 2001

(30) Foreign Application Priority Data

Feb. 16, 2000 (EP) ............................................. 00200517

(51) Int. Cl.$^7$ ................................................. B01F 3/04
(52) U.S. Cl. .................. 261/114.1; 261/114.5
(58) Field of Search ............................. 261/114.1, 114.2, 261/114.3, 114.4, 114.5

(56) References Cited

U.S. PATENT DOCUMENTS

| | | | |
|---|---|---|---|
| 5,098,615 A | | 3/1992 | Resetarits |
| 5,223,183 A | * | 6/1993 | Monkelbaan et al. ..... 261/114.1 |
| 5,244,604 A | * | 9/1993 | Miller et al. ............. 261/114.1 |
| 5,277,848 A | * | 1/1994 | Binkley et al. ........... 261/114.1 |
| 5,382,390 A | * | 1/1995 | Resetarits et al. ....... 261/114.3 |
| 5,387,377 A | * | 2/1995 | Chuang .................... 261/114.1 |
| 5,618,473 A | * | 4/1997 | Sauter et al. ............. 261/114.1 |
| 5,690,708 A | * | 11/1997 | Danckaarts et al. ...... 261/114.1 |
| 5,975,504 A | * | 11/1999 | Nutter et al. ............. 261/114.3 |
| 6,250,611 B1 | * | 6/2001 | Pilling et al. ............. 261/114.3 |

FOREIGN PATENT DOCUMENTS

| | | | |
|---|---|---|---|
| BE | 584426 | 11/1959 | |
| EP | 0055496 A1 | 7/1982 | |
| GB | 823108 | * 11/1959 | ............... 261/114.1 |
| GB | 1416732 | 3/1975 | |
| WO | WO 99/11347 | 11/1999 | |

OTHER PUBLICATIONS

International Search Report of Jul. 4, 2001.

\* cited by examiner

Primary Examiner—C. Scott Bushey

(57) ABSTRACT

Gas/liquid contact tray for use in a column for countercurrently contacting gas and liquid, which tray has a perforated panel of which the area is divided in two or more parallel sections wherein the odd numbered sections are provided with downcomers directed perpendicular to the direction of the section, wherein the bottoms of the downcomers are provided with lateral outflow openings directed in the direction of the sections, and wherein the bottom of each of the downcomers in the section(s) neighbouring the wall of the column is also provided with a frontal outflow opening directed in the direction of the wall.

5 Claims, 2 Drawing Sheets

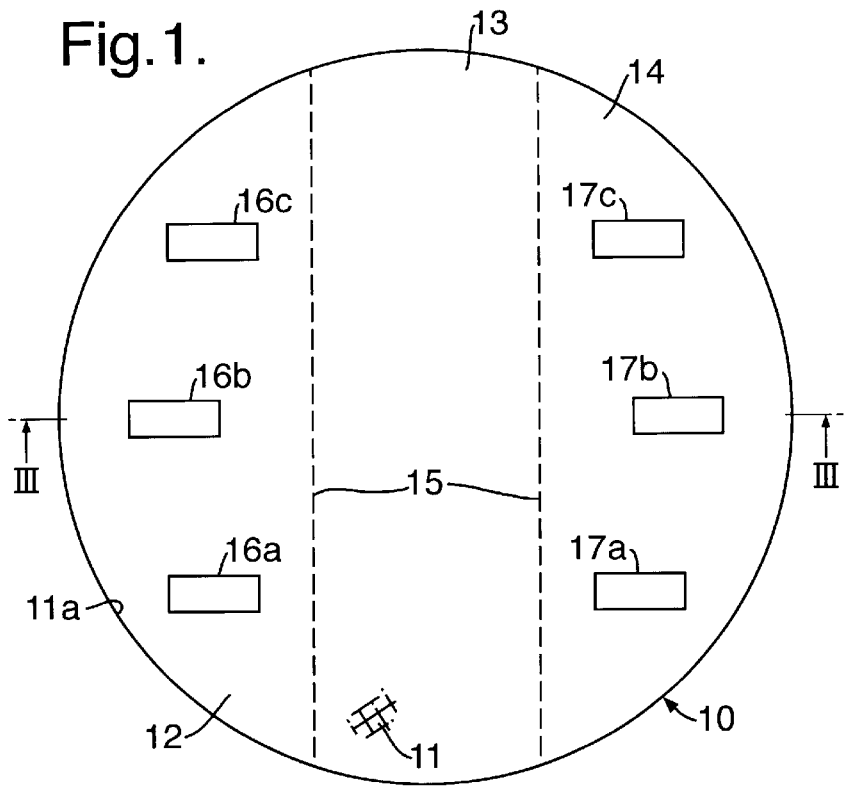
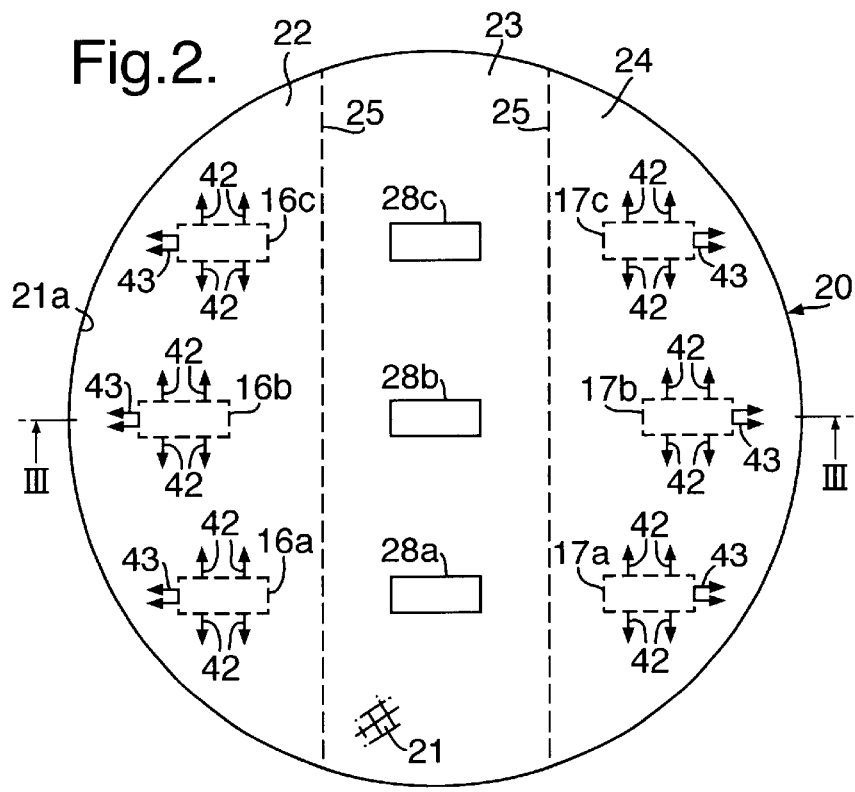

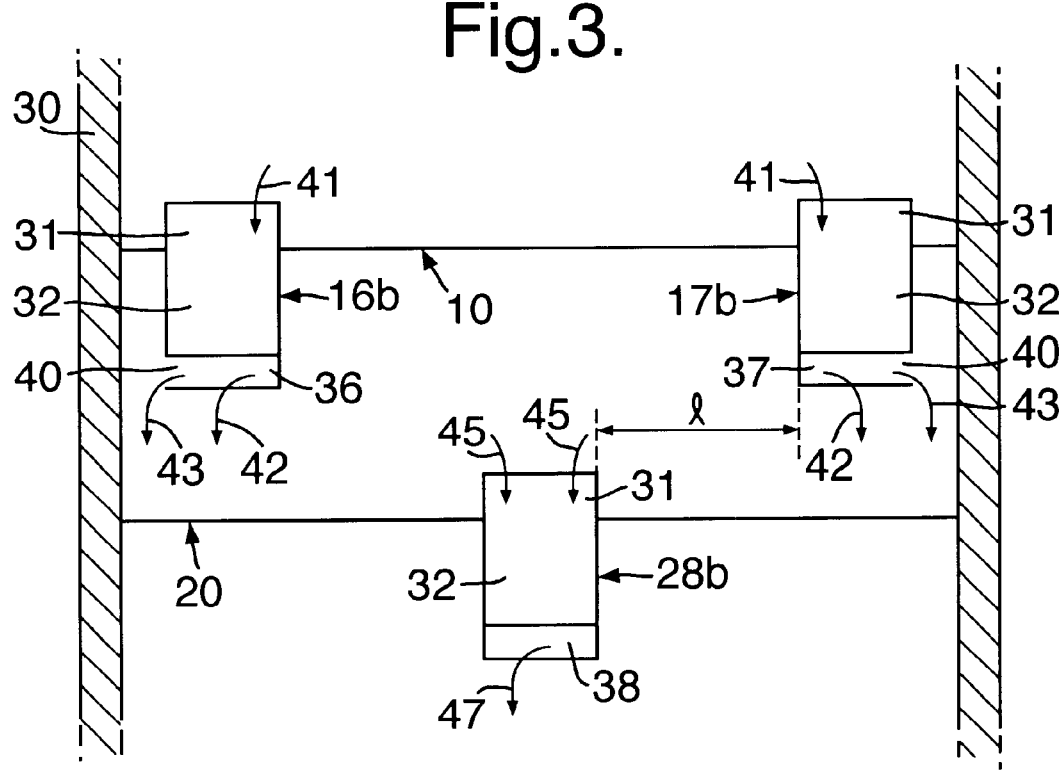

GAS/LIQUID CONTACT TRAY

FIELD OF THE INVENTION

The present invention relates to a gas/liquid contact tray for use in a column for counter-currently contacting gas and liquid. Such a column is any column in which gas and liquid are counter-currently contacted to exchange heat or matter. An example of such a column is a fractionation column and a further example is a vacuum distillation column.

BACKGROUND OF THE INVENTION

In such a column liquid flows, during normal operation, downwards from top to bottom, whereas gas flows upwards from bottom to top. In the specification and in the claims the word 'gas' is used to refer to gas and to vapour.

Such a column is provided with a number of horizontal gas/liquid contact trays arranged one above the other. Each tray comprises a perforated panel provided with one or more downcomers. The downcomer is a conduit for downward passing of liquid arranged in an opening in the perforated panel, the part of the wall of the downcomer extending above the perforated panel is called the downcomer weir, and the part of the downcomer extending below the perforated panel is called the downcomer apron.

During normal operation liquid collected on a tray flows over the perforated panel where it is contacted with upwardly flowing gas passing through the perforations. Then the liquid will flow over the downcomer weir into the downcomer and onto the perforated panel of the tray below, and so on. It will be understood that the downcomers of two adjacent trays are not placed directly above each other, but spaced apart in lateral direction (or staggered) in order to prevent liquid from falling directly into the downcomer of the lower tray. Moreover, the downcomers are so located that the liquid exiting the downcomers can flow evenly over the perforated panel. In this way it is achieved that the time during which gas and liquid are in contact with each other is independent from the position of a liquid element on the perforated panel.

The gas/liquid contacting tray to which the present invention relates comprises a perforated panel of which the area is divided in two or more parallel sections, wherein either the odd numbered sections or the even numbered sections are provided with a plurality of downcomers directed perpendicular to the direction of the section, and wherein the bottoms of the downcomers are provided with lateral outflow openings directed in the direction of the sections.

Such a gas/liquid contacting tray is disclosed in Belgian patent specification No. 584 426, and described in more detail with reference to FIGS. 8, 9 and 14 IV.

The gas/liquid contacting tray shown in FIGS. 8 and 9 of this publication comprises a perforated panel of which the area is divided in two parallel sections, wherein either the first section (FIG. 8) or the second section (FIG. 9) is provided with a plurality of downcomers directed perpendicular to the direction of the section, and wherein the bottoms of the downcomers are provided with lateral outflow openings directed in the direction of the sections. This arrangement is selected to get an even distribution of liquid flowing during normal operation over the perforated panel, so as to prevent a stagnant zone near the edge of the perforated panel, where the liquid could reside longer than the average residence time of liquid on the tray. Applicant, however, had found that this arrangement did not fully eliminate the stagnant zone.

It is an object of the present invention to overcome this problem.

SUMMARY OF THE INVENTION

To this end the gas/liquid contact tray according to the present invention for use in a column for counters-currently contacting gas and liquid comprises a perforated panel of which the area is divided in two or more parallel sections, wherein either the odd numbered sections or the even numbered sections are provided with a plurality of downcomers directed perpendicular to the direction of the section, wherein the bottoms of the downcomers are provided with lateral outflow openings directed in the direction of the sections, and wherein the bottom of each downcomer in the section(s) neighbouring the wall of the column is also provided with a frontal outflow opening directed in the direction of the wall.

BRIEF DESCRIPTION OF THE DRAWINGS

The invention will now be described by way of example in more detail with reference to the accompanying drawings, wherein FIG. 1 shows schematically a top view of a gas/liquid contacting tray according to the present invention;

FIG. 2 shows schematically a top view of a gas/liquid contacting tray according to the present invention, which is arranged below the tray of FIG. 1; and FIG. 3 shows a cross-sectional view along the lines III—III of FIGS. 1 and 2, wherein also the column wall is shown.

DETAILED DESCRIPTION OF THE INVENTION

Reference is now made to FIGS. 1 and 2. The gas/liquid contact tray shown in FIG. 1 is referred to with reference numeral 10, and the tray shown in FIG. 2 with reference numeral 20. Each tray 10 and 20 comprises a perforated panel 11 and 21. The edge of the perforated panel is referred to by reference numeral 11a and 21a. For the sake of clarity only part of the perforated panel is hatched.

The area of the perforated panel 11 and 21 is divided in three parallel sections 12, 13, 14 and 22, 23 and 24. The dashed lines 15 and 25 indicate the boundaries between adjacent sections.

The odd numbered sections 12 and 14 of the tray shown in FIG. 1 are provided with a plurality of elongated downcomers 16a, 16b and 16c and 17a, 17b and 17c. The elongated downcomers 16a, 16b and 16c and 17a, 17b and 17c are directed perpendicular to the direction of the sections 12 and 14, in other words their longitudinal axes (not shown) are directed perpendicular to the longitudinal axis (not shown) of the sections.

The even numbered section 23 of the tray shown in FIG. 2 is provided with three elongated downcomers 28a, 28b and 28c directed perpendicular to the direction of the section 23. The projections of the downcomers 16a–c and 17a–c of tray 10 on tray 20 are shown by means of dashed lines.

The bottom of each of the elongated downcomers 16a–c, 17a–c and 28a–c is provided with lateral outflow openings directed in the direction of the sections 12, 14 and 23.

These lateral outflow openings are shown more clearly in FIG. 3, which figure shows the trays 10 and 20 arranged in a column of which the wall is referred to by reference numeral 30. The supports of the trays 10 and 20 are not shown. In this Figure the reference numeral 31 is used to refer to the downcomer weirs and the reference numeral 32 is used to refer to the downcomer apron. The lateral outflow openings are referred to by reference numerals 36, 37 and 38.

Furthermore, the bottoms of the downcomers 16*a–c* in the section 12 neighbouring the wall 30 of the column are also provided with frontal outflow openings 40 directed in the direction of the wall 30. The section neighbouring the wall will be an odd numbered section.

During normal operation liquid exiting the downcomers of the tray (not shown) above the tray 10 is collected on this tray 10 and it is contacted with upwardly flowing gas passing through the perforations of the perforated panel 11. The liquid flows to the downcomers 16*a–c* and 17*a–c*. The liquid flows over the weirs 31 (see arrows 41 in FIG. 3), and it exits the downcomers 16*a–c* and 17*a–c* through the lateral outlet openings 36 and 37 (arrows 42) and through the frontal outlet openings 40 (arrows 43). The arrows 42 and 43 are also shown in FIG. 2.

The liquid is collected on tray 30 and it is contacted with upwardly flowing gas passing through the perforations of the perforated panel 21. The liquid flows over the perforated panel 21 to the downcomers 28*a–c*. The liquid flows over the weirs 31 (see arrows 45 in FIG. 3), and it exits the downcomers 28*a–c* through the lateral outlet openings 38 (arrow 47).

The liquid flowing out of the frontal openings 40 causes turbulence in the liquid on the tray 20 near the wall 30 of the column, and in this way stagnant zones near the wall 30 are effectively prevented.

In order to increase the flow path length l (see FIG. 3), the side of a downcomer apron that is directed to the downcomer weir pertaining to the below tray can be tilted. This is shown for the downcomer 17*b* in FIG. 3. A downcomer apron tapered in that way can also be applied to the downcomers 28*a–c* of the tray 20.

In the embodiment of the invention shown in the figures, both the lateral outlets 36, 37 and 38 and the frontal outlets 40 are in the form of slits. In an alternative embodiment, the bottom of the downcomer is closed and the outlets are formed by openings near the closed bottom.

In the embodiment as shown in the figures, the trays 10 and 20 are divided in three sections, wherein the number of downcomers of the tray 10 (six) is twice the number of downcomers (three) of the tray 20. Suitably the number of sections is even, two, four, six or eight, so that each tray can have the same number of downcomers. The number of downcomers per section is suitably in the range of from three to five.

I claim:

1. A gas/liquid contact tray for use in a column having walls for counter-currently contacting gas and liquid comprising:

a perforated panel divided into two or more parallel even-numbered and odd-numbered sections, each of the sections having a longer, major axis in a first direction, and a shorter, minor axis in a second direction, said second direction being perpendicular to the first direction, in which either the even-numbered or odd-numbered sections comprise a plurality of downcomers situated perpendicular to the longer, major axis of the first direction of the section, wherein the downcomers have bottoms with lateral outflow openings directed in the first direction of the sections, and wherein the bottom of each downcomer in a section neighbouring a wall of the column is provided with a frontal outflow opening directed toward the wall of the column.

2. The gas/liquid contact tray of claim 1 in which the downcomers further comprise downcomer aprons.

3. The gas/liquid contact tray of claim 2 in which the downcomer aprons are tapered.

4. The gas/liquid contact tray of claim 1 in which the lateral and frontal outflow openings are in the form of slits.

5. The gas/liquid contact tray of claim 1 in which the number of downcomers per section is in the range of from 3 to 5.

* * * * *